July 5, 1960 G. V. MUMFORD ET AL 2,943,348
APPARATUS FOR FORMING HOLLOW PLASTIC ARTICLES
Filed Jan. 11, 1954 7 Sheets-Sheet 1
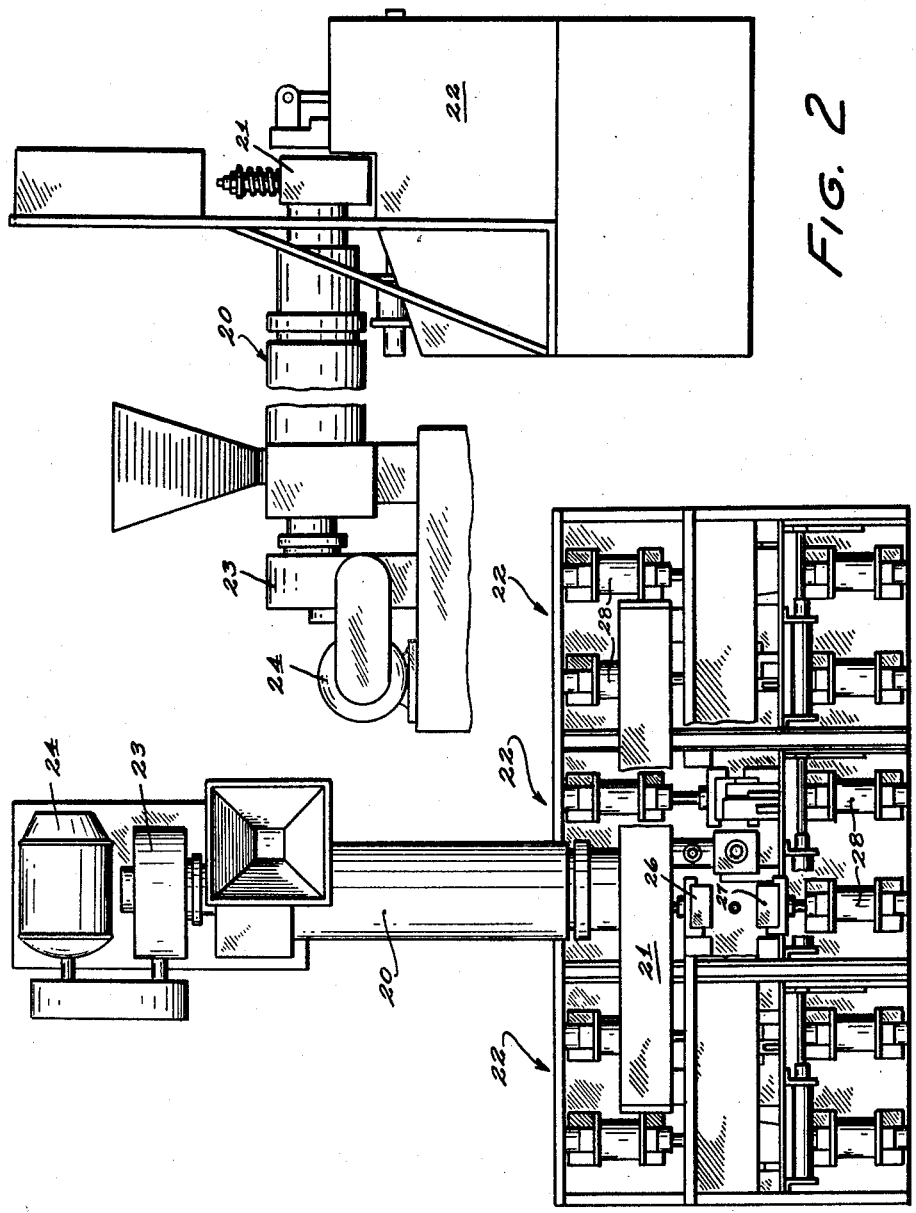
GEORGE V. MUMFORD
ORVILLE B. SHERMAN
Inventors
By Rule & Hoge
Attys.

July 5, 1960   G. V. MUMFORD ET AL   2,943,348
APPARATUS FOR FORMING HOLLOW PLASTIC ARTICLES
Filed Jan. 11, 1954   7 Sheets-Sheet 2

GEORGE V. MUMFORD
ORVILLE B. SHERMAN
Inventors

By Rule & Hoge
Attys.

July 5, 1960 G. V. MUMFORD ET AL 2,943,348
APPARATUS FOR FORMING HOLLOW PLASTIC ARTICLES
Filed Jan. 11, 1954 7 Sheets-Sheet 6

GEORGE V. MUMFORD
ORVILLE B. SHERMAN
Inventors

By Rule & Hoge
Attys.

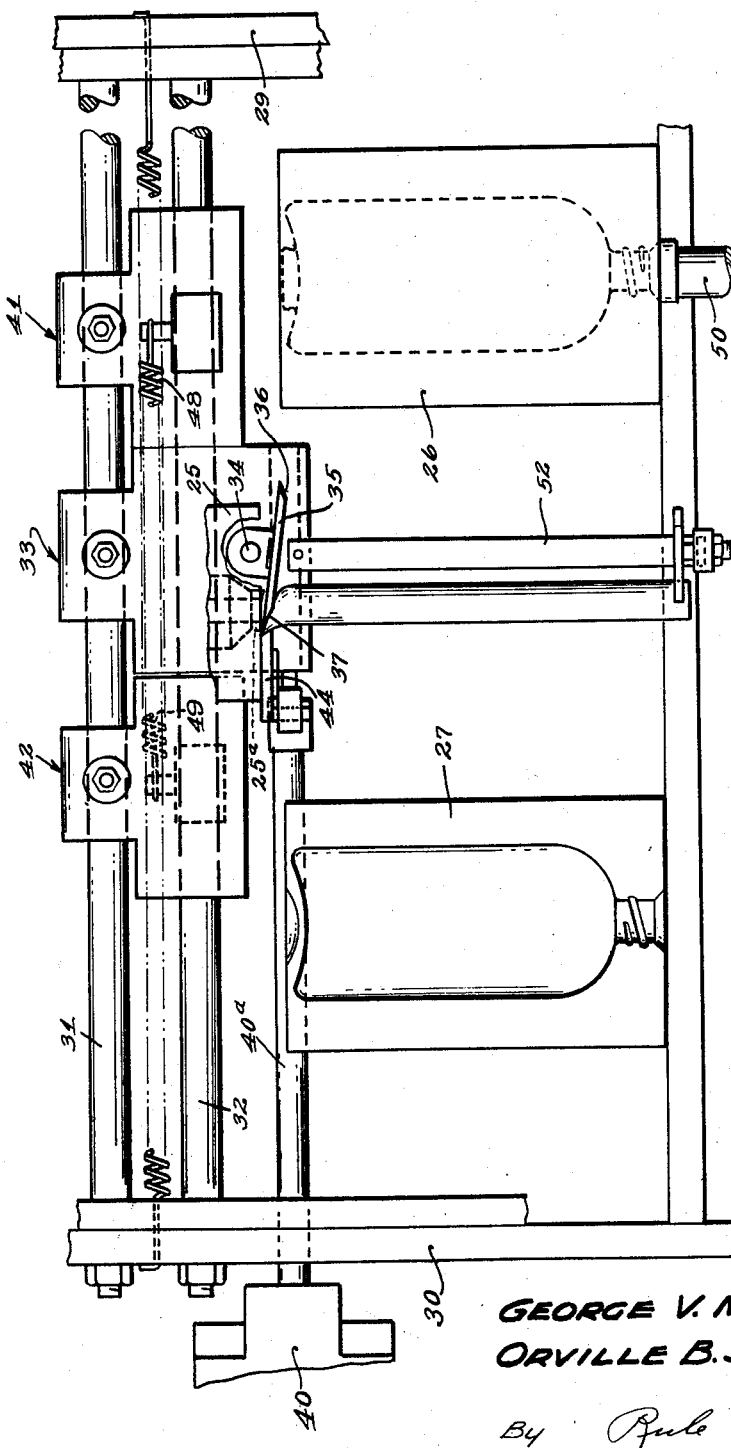

United States Patent Office 2,943,348
Patented July 5, 1960

2,943,348

APPARATUS FOR FORMING HOLLOW PLASTIC ARTICLES

George V. Mumford and Orville B. Sherman, Toledo, Ohio, assignors to Owens-Illinois Glass Company, a corporation of Ohio Filed Jan. 11, 1954, Ser. No. 403,178

13 Claims. (Cl. 18—5)

This invention relates to an apparatus for forming hollow plastic articles and particularly to an apparatus for forming hollow plastic articles according to the method set forth in the patent application titled, "Method of Forming Hollow Plastic Articles," Serial No. 381,220, filed September 21, 1953 by Orville B. Sherman, now Patent No. 2,783,503.

According to the method set forth in the aforementioned patent application, plastic material in a suitable condition of plasticity is supplied downwardly in the form of plastic tubing, measured lengths of tubing are successively severed from said continuously supplied tubing and alternately transferred to a series of molds positioned laterally of the continuously downwardly supplied tubing, and each transferred length is expanded in its respective mold by applying fluid under pressure.

It is therefore an object of this invention to provide an apparatus for forming hollow plastic articles according to this method.

Other objects of the invention will appear hereinafter.

Basically the apparatus comprises means for downwardly extruding tubing of plastic material, series of molds positioned laterally of the means for supplying the tubing, and means for severing measured lengths of tubing from said continuously extruded tubing and transferring said severed lengths to one of said molds. The apparatus further includes means for applying fluid under pressure to each severed length of tubing to expand said tubing to the walls of the mold.

Referring to the accompanying drawings:

Fig. 1 is a plan view of the apparatus, parts being broken away;

Fig. 2 is a side elevational view;

Fig. 11 is a sectional view at the line XI—XI on Fig. 4.

Figure 3:
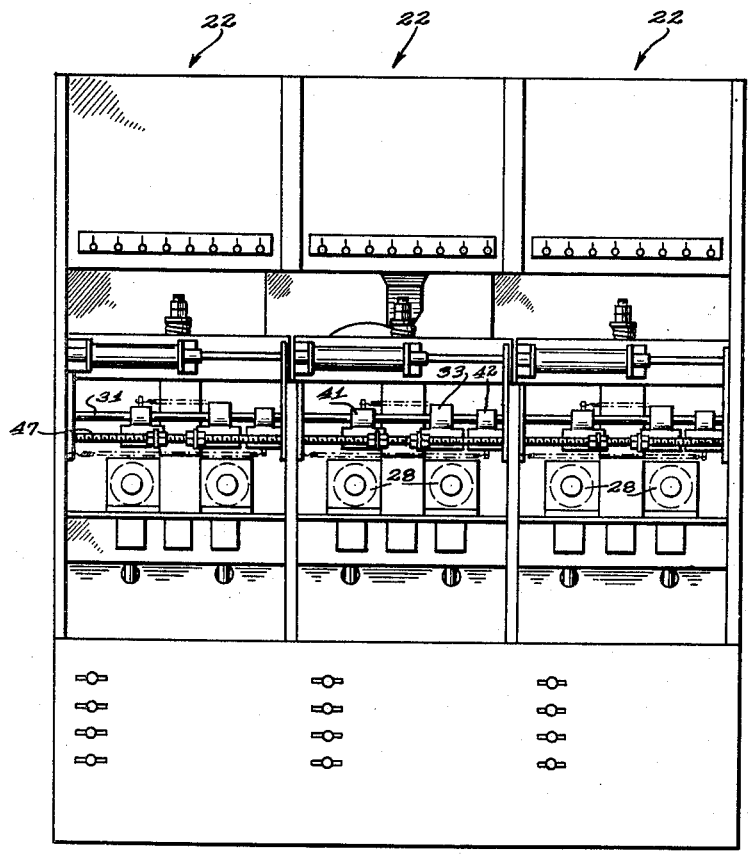
Fig. 3 is a front elevational view.

As shown in Figs. 1, 2 and 3 the apparatus comprises an extruder 20 for supplying plastic material to a header 21 which in turn supplies the plastic material to a multiplicity of article forming mechanisms 22, herein shown as three in number. The extruder is driven by gear box 23 and motor 24. The article forming mechanisms 22 are identical in structure although they may differ in size for making articles of different sizes. For purposes of clarity only one of the mechanisms will be described herein.

Figure 4:
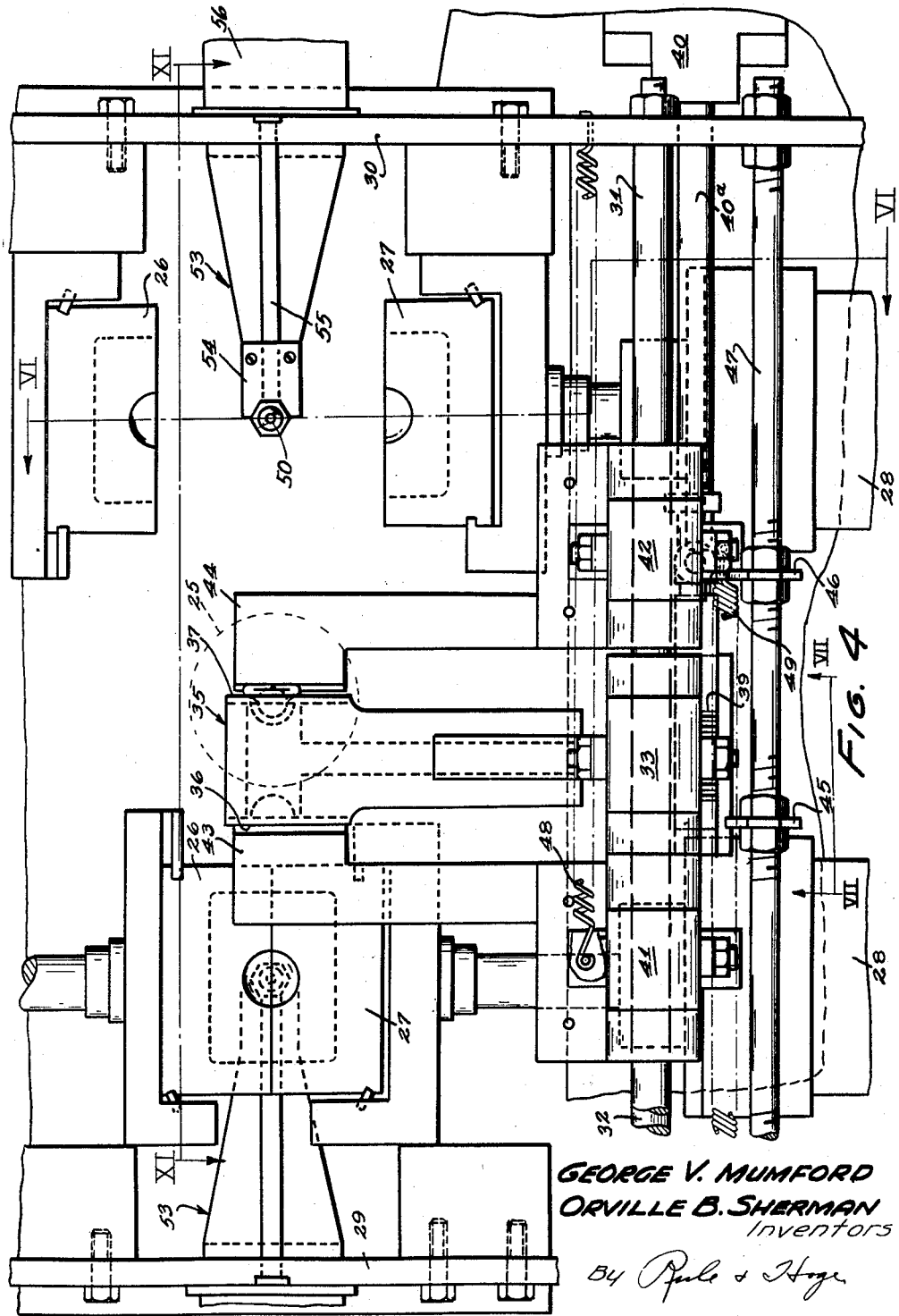
Fig. 4 is a plan view of one of the article forming sections of the apparatus.
Figure 5:
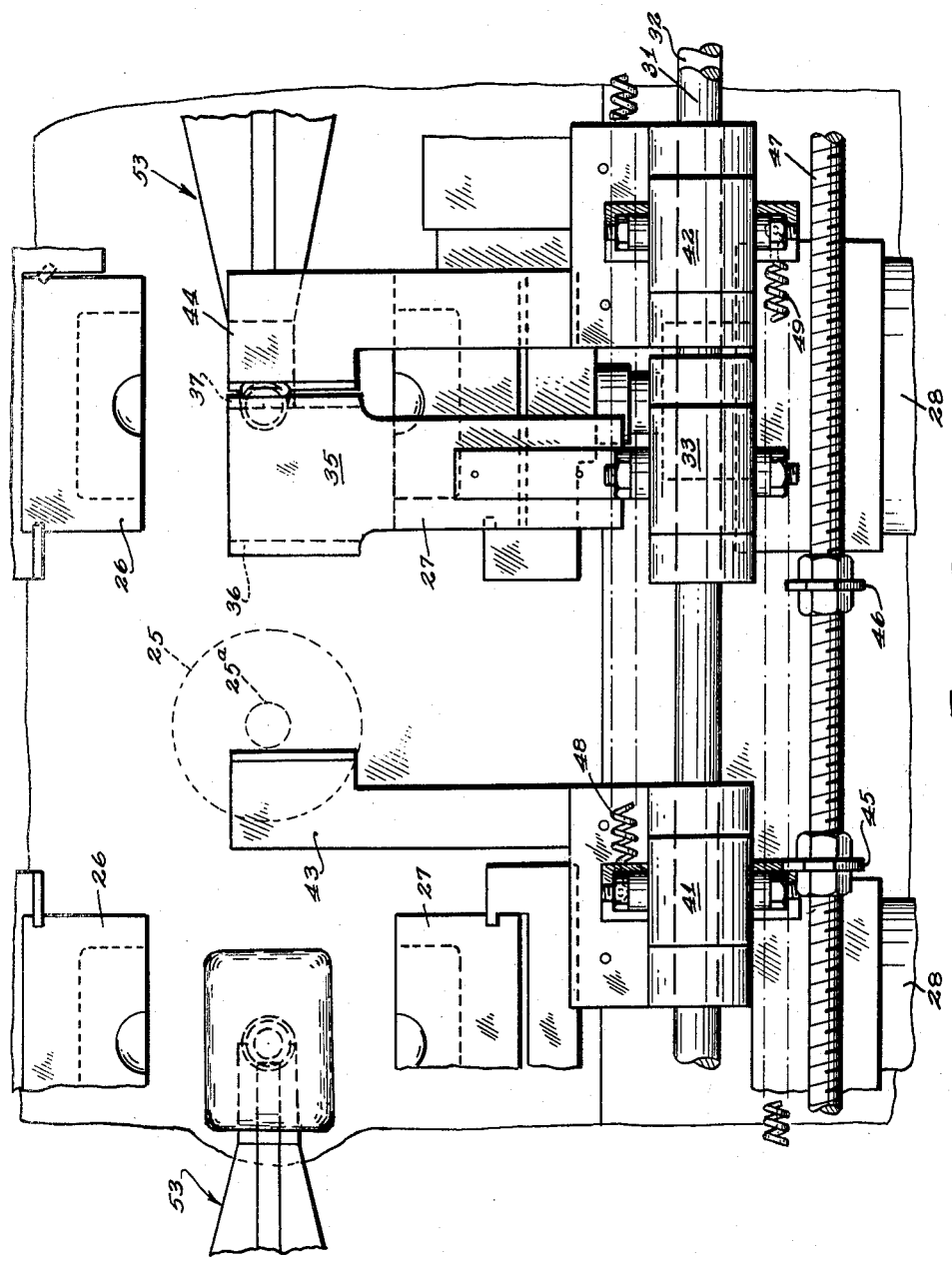
Fig. 5 is a view similar to Fig. 4 with the parts in a different position.

Referring to Figs. 4, 5 and 11, each of the article forming mechanisms includes an extrusion head 25 having an extrusion orifice for continuously providing plastic material in a tubular form in a downward direction. Mold halves 26, 27 of a partible mold are positioned laterally on either side of the extrusion orifice. Means comprising cylinders 28 individual to each mold half are provided for opening and closing the molds. The mold halves are constructed to form a cavity such that the upper end of a length of tubing is pinched without severing and the lower end is left open in order that fluid under pressure may be applied for expanding the tubing as hereinafter described.

Means is provided for successively severing measured lengths of tubing from the tubing being supplied and alternately transferring said severed lengths to one of the pair of molds 26, 27. This means includes upright members 29, 30 having vertically spaced horizontal shafts 31, 32 extending between the members. A support 33 is slidably mounted on the shafts 31, 32 and a shear blade supporting shaft 34 pivotally mounted thereon. The shear blade supporting shaft 34 has a shear blade 35 mounted on one end thereof. The shear blade 35 is provided with two shearing edges 36 and 37 adapted to pass across the orifice $25^a$ as the shear blade support 33 is moved on the shafts 31, 32.

Figure 7:
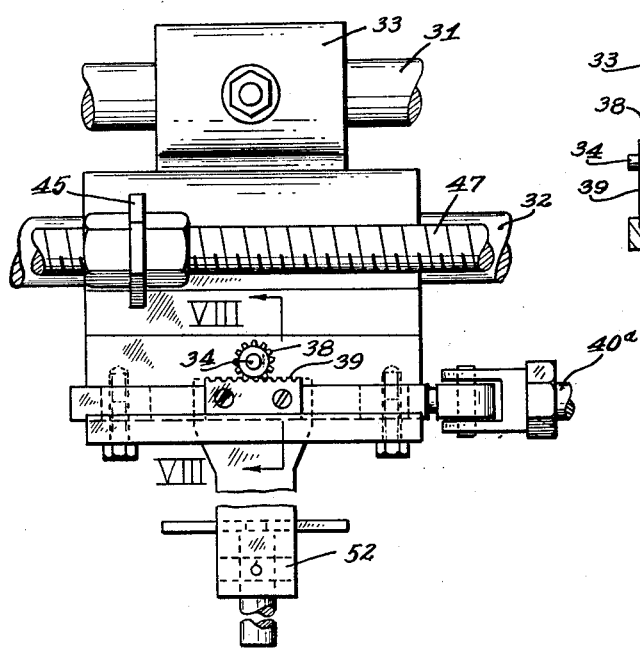
Fig. 7 is a fragmentary sectional view at the line VII—VII on Fig. 4.
Figure 8:
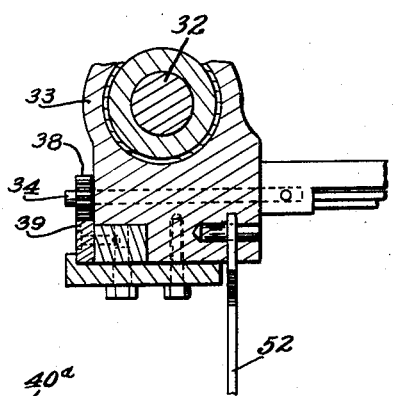
Fig. 8 is a sectional view at the line VIII—VIII on Fig. 7.
Figure 9:
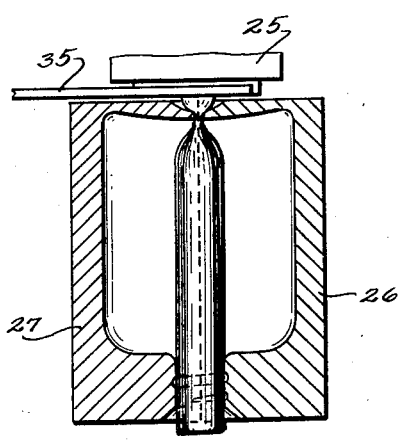
Figs. 9 and 10 are sectional views through the molds showing the expansion of the tubing.
Figure 10:
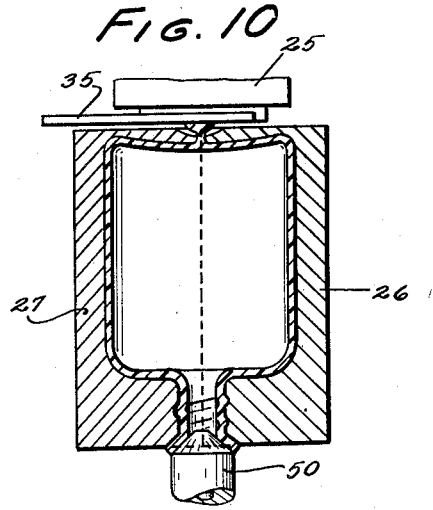

As shown in Figs. 7 and 8, a pinion 38 is fastened to the other end of the shear blade supporting shaft 34 and meshes with a rack 39 mounted for limited sliding movement in the support 33. An air cylinder 40 is provided to cause reciprocating movement of the support 33 and in turn the shear blade. Shaft $40^a$ of the air cylinder 40 is connected to the support through the rack 39 (Fig. 7). When the shear blade support has reached the limit of its movement in one direction and the air cylinder 40 is actuated to return the support a limited initial movement of the rack 39 relative to the support 34 takes place thereby pivoting the shear blade 35 through the pinion 38. Continued actuation of the air cylinder thereafter moves the rack 39 and support 33 in unison carrying the shear blade 35 across the orifice $25^a$.

In addition to the shear blade support 33, arm supports 41, 42 are provided on either side of the shear blade support 33. Arms 43, 44 are mounted on the arm supports 41, 42, respectively. The movement of each arm support is limited between a position adjacent to the orifice and a position overlying a mold by stops 45, 46, respectively, mounted on a shaft 47 extending between the upright members. Springs 48, 49 extending between the uprights and the respective arm supports 41, 42 maintain the arms in position adjacent to the orifice. As the shear blade 35 is moved across the orifice severing a length of tubing, the severed length of tubing is pinched between the shear blade 35 and the adjacent arm 44 and continued movement of the shear blade pushes the arm and carries the severed length to a position between the mold halves.

Figure 6:
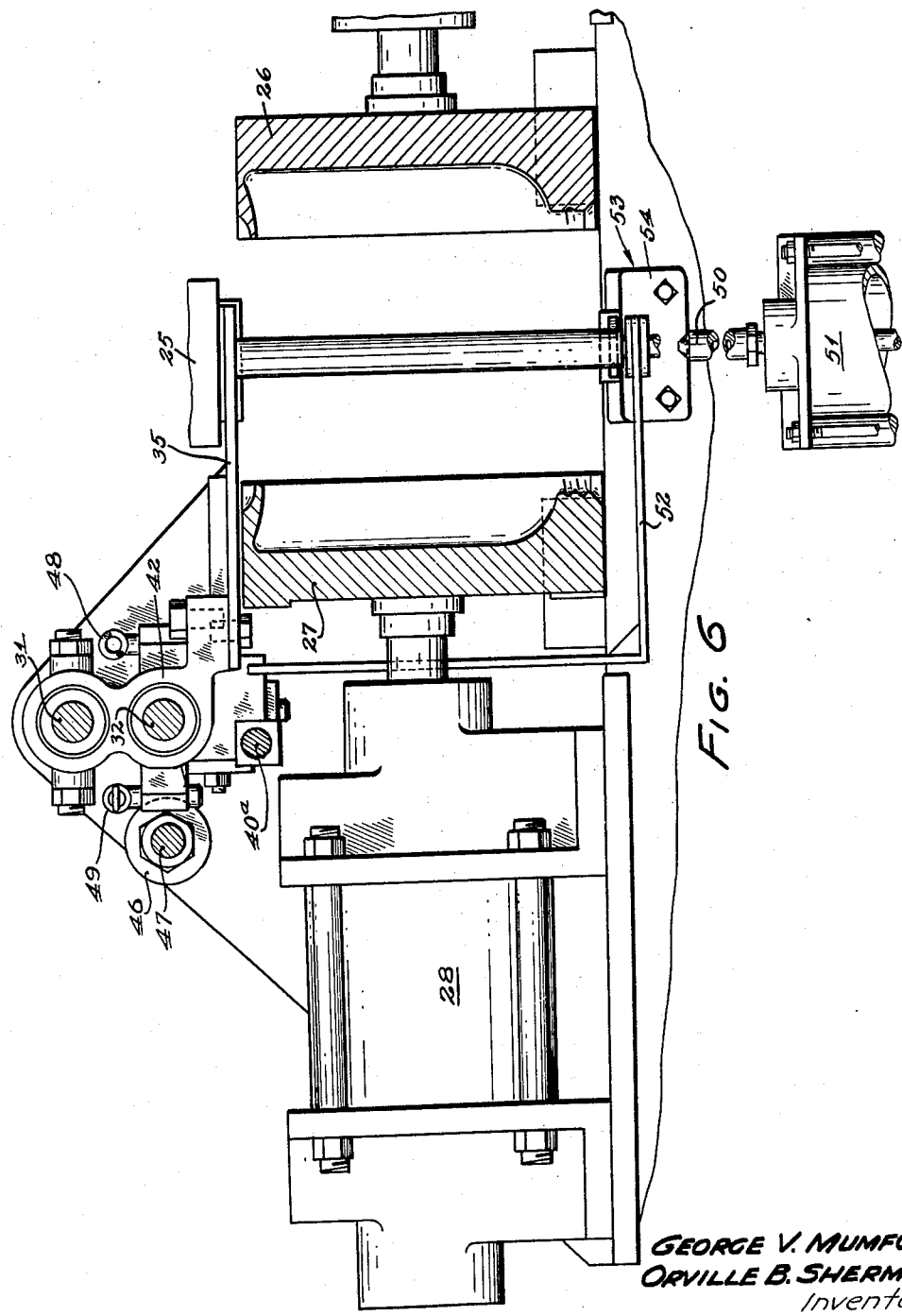
Fig. 6 is a sectional view at the line VI—VI on Fig. 4.

Each of the molds is provided, as shown in Fig. 6, with a nozzle 50 through which fluid under pressure may be provided to the tubing in order to expand the tubing to the walls of the mold. An air cylinder 51 or other means may be provided for moving the nozzle 50 into and out of position.

The shear blade support 33 includes an arm 52 projecting downwardly and adapted to contact the lower end of the severed length of tubing and guide it into position as it is transferred to the mold.

After the article has been blown and the mold halves are opened, a positive ejection of the article is achieved by an ejection mechanism 53. This mechanism includes a stationary member 54 adapted to contact the lower end of the article and a reciprocating member 55 slidably mounted in the stationary member. After the mold halves are opened the reciprocating member 55 is actuated by a small cylinder 56 providing a positive force on the lower end of the article to cause it to be ejected.

The operation of the apparatus may be summarized as follows:

As shown in Fig. 11, plastic material is continuously extruded downwardly in tubular form from the orifice of an extrusion head 25. As the tubing is extruded to the desired length, it is severed by movement of the shear blade 35 at an angle across the orifice 25ᵃ. This movement is accomplished by sliding of the shear blade support 33 along the shafts 31, 32. The shearing of plastic material by movement of the angularly disposed blade across the orifice results in a severing in such a manner that the end of the tubing being extruded remains open and the extrusion continues without substantial interruption because of the live contact of the shearing edge with the orifice. As the shear blade continues in its movement to the left as shown in Fig. 11 (to the right as shown in Fig. 4) the upper end of the severed length of tubing is pinched between the arm 44 and the shear blade. Continued movement of the shear blade support moves the arm 44 against the action of the spring 49. The severed length of tubing is thereby carried to a position between the halves of the mold (Fig. 5). The mold halves are then closed by actuation of the cylinders 28, pinching the upper end of the tubing and leaving the lower end of the tubing open. The nozzle 50 is then brought into contact with the lower end of the tubing by actuation of the cylinder 51 and fluid under pressure is introduced to expand the plastic material to the confines of the mold. After the article has been formed the molds are opened and simultaneously the lower end of the hollow article which has been formed is given a slight movement by actuation of the ejection mechanism 53 to cause a positive ejection of the article.

After the length of tubing has been transferred to the mold for expansion, the shear blade may be returned and a second length of tubing may be severed from the extruder. This is accomplished by reversing the action of the cylinder 40. Initial reversal of the cylinder 40 causes movement of the shaft 40ᵃ pivoting the shear blade through the rack 39 and pinion 38 (Fig. 7). Further movement of the shaft 40ᵃ moves the shear blade through the shear blade support 33 toward the orifice. The arm support 42 and arm 44 are carried along with the movement of the shear blade support through the action of the spring 49.

As the shear blade is moved past the orifice, a second length of tubing is severed and pinched between the second arm 43, and thereafter transferred between the halves of the second mold. The pinching or gripping action between the shear blade and the arm 43 is insured by the spring 48 against which the arm must be moved. After the tubing has been transferred, the second mold may be closed and the tubing expanded to the walls of the mold in a similar manner as in the first length of tubing. The movement of the shear blade may then be reversed initially pivoting the shear blade and thereafter moving the shear blade across the orifice again to sever a third length of tubing and again begin the cycle of operations.

The terms tubular or tubing are used herein to define any hollow shapes of plastic material and include non-circular and irregular shapes.

The terms plastic and thermoplastic are used herein to define any organic material capable of being provided in a condition of plasticity for expansion to hollow form.

Modifications may be resorted to within the spirit and scope of the appended claims.

We claim:

1. An apparatus for forming hollow plastic articles comprising an extrusion device having an extrusion orifice for downwardly extruding plastic material in the form of a tube, a pair of partible molds, one of said molds being positioned laterally on each side of said orifice, means individual to each said mold for opening and closing said mold, a shear blade mounted for lateral movement across said orifice in such a manner that a length of tubing is severed from the tubing being extruded and the end of the tubing being extruded remains open, means for moving said shear blade from a position overlying one mold across said orifice to a position overlying the second mold, means cooperating with said shear blade for gripping and transferring a severed length of tubing from a position below the orifice to one of the two molds, and means individual to each said mold for supplying fluid under pressure to the tubing to expand the tubing to the walls of the mold.

2. The apparatus set forth in claim 1, said molds being constructed in such a manner that one end of the severed length of tubing is pinched and the other end of the severed length of tubing is left open.

3. The apparatus set forth in claim 1, said means cooperating with the blade to grip and transfer the severed lengths comprising a pair of arms, said arms being mounted for movement along the path of the shear blade, one of said arms being mounted on either side of said shear blade, means for resiliently holding each said arm in position adjacent the orifice whereby when the shear blade is moved across the orifice, severing a length of tubing, continued movement of the shear blade pinches the severed length between the shear blade and the arm and further movement causes the arm to move carrying the pinched length of tubing to a position between the parts of the partible mold, and means for supplying fluid under pressure to the tubing when the parts of the mold are closed to expand the tubing to the walls of the mold.

4. An apparatus for forming hollow plastic articles comprising an extrusion device having an extrusion orifice for downwardly extruding plastic material in the form of a tube, a pair of partible molds, one of said molds being positioned laterally on either side of said orifice, a shear blade having a pair of shearing edges movable across and in contact with said orifice and severing lengths of tubing from the tubing being extruded in such a manner that the end of the tubing being extruded remains open, a support in which said shear blade is pivotally mounted, means for moving said support in such a manner that the shear blade is moved from a position overlying one mold across said orifice to a position overlying the second mold, means for pivoting the position of the blade with respect to the support thereby bringing alternate shearing edges of the blade into contact with the orifice during alternate directions of movement of the support, an arm mounted for limited movement between one mold and a position adjacent said orifice, a second arm mounted for limited movement between said second mold and a position adjacent said orifice, means individual to each said arm for resiliently holding said arm in position adjacent the orifice, whereby movement of the shear blade across the orifice severs a length of tubing and continued movement of the shear blade causes said severed length of tubing to be gripped between the shear blade and the arm adjacent the orifice and further movement of the shear blade causes the arm to move, transferring the severed length of tubing to a position between the parts of the mold on one side of the orifice, whereby upon return movement of the shear blade the shear blade is pivoted bringing the second shearing edge of the shear blade into position to contact with the orifice, severing a second length of tubing and causing said second length of tubing to be gripped between the shear blade and the second arm and be thereby transferred to a position between the parts of the second mold, and means individual to each said mold for supplying fluid under pressure to a length of tubing supplied thereto to expand said tubing to the walls of the mold.

5. The apparatus set forth in claim 4, said means for pivoting the shear blade with respect to its support comprising a rack mounted for limited sliding movement in said support, one end of said rack being connected to the means for moving the support, a pinion meshing with the said rack and connected to said shear blade whereby upon movement of the means for moving the support the rack is caused to move a limited distance relative to the support pivoting the shear blade and upon further movement of the means for moving the support, the support and in turn the shear blade are moved in unison.

6. The apparatus set forth in claim 4 including means for guiding the lower end of the severed length of tubing during its transfer to a position between the parts of a mold.

7. The apparatus set forth in claim 6, said guiding means including an arm mounted on said support and adapted to contact the lower end of the tubing.

8. The apparatus set forth in claim 4 including means for causing a positive ejection of the plastic articles from the molds after the tubing has been expanded to the walls of the mold and the mold parts are open.

9. The apparatus set forth in claim 8, said means comprising a reciprocating plunger adapted to strike the lower part of the article when the mold halves are opened, and means for reciprocating said plunger.

10. An apparatus for forming hollow plastic articles which comprises means for continuously supplying tubing of plastic material, said tubing being in a condition of plasticity to permit expansion and setting in predetermined form, means for severing a length of tubing from the remaining tubing being supplied in such a manner that the end of the tubing being supplied remains open and the extrusion movement of the tube being supplied remains substantially undisturbed, said severing device being mounted for movement laterally from the tube supplying means alternately to a plurality of molding positions, means cooperating with and movable by the severing device for gripping and transferring said severed lengths of tubing from the tube supplying device to the various positions, means to move said severing device alternately between said forming positions, and means at each said molding position adapted to expand said tube lengths to hollow articles.

11. An apparatus for forming hollow plastic articles which comprises means for continuously supplying tubing of plastic material, said tubing being in a condition of plasticity to permit expansion and setting in predetermined form, means for successively severing lengths of tubing from the remaining tubing being supplied in such a manner that the end of the tubing being supplied remains open and the movement of the tube being supplied remains substantially undisturbed, said severing device being mounted for movement between the tube supplying device and alternate positions spaced laterally of said tube supplying device, and a pair of gripping devices adapted to individually cooperate with said severing device for gripping and transferring the severed lengths of tubing to the respective positions, one of said gripping devices being mounted for limited movement between the tube supplying device and the one lateral position and the other gripping device being mounted for limited movement between the tube supplying device and the second lateral position.

12. In an apparatus for forming hollow plastic articles having an opening at one end including an extrusion device for extruding heated plastic material downwardly from an orifice in the form of an unconfined hollow open-ended tube, a shear blade mounted exteriorly of said orifice for lateral movement to sever a length of extruded tubing therefrom, said severance leaving successive extrusions of tubing with open ends, and means to actuate said shear blade, the improvement of a partible mold at a molding station remote from the orifice and arranged for opening and closing movement, said mold having an open end portion and a body forming portion, transfer means engageable with a severed tube at the orifice and operable to transfer the severed tube to the molding station, means for closing said mold on said tube at said molding station with an open end portion of said tube confined in the open end portion of said mold, a combination positioning and blowing nozzle insertable into the open end of said tube after closure of the mold and cooperating with the mold to secure said tube in axial alignment with the cavity of said mold, and means to supply fluid under pressure through said nozzle to expand said tube in said mold.

13. In an apparatus for forming hollow plastic articles comprising an extrusion device for extruding heated plastic material downwardly from an orifice in the form of an unconfined hollow open-ended tube, a partible mold at a molding position spaced from said orifice and arranged for opening and closing movements, said mold having its neck and body forming portions in inverted order, a shear blade mounted between said orifice and mold and arranged for lateral movement across said orifice to sever a length of extruded tubing therefrom, said severance leaving the successive extrusions of tubing with open ends, means to actuate said shear blade, vertically spaced aligning means contactable with the free ends of the severed tube and operable to maintain the lower free end of the tube in vertical alignment with the upper portion of said extruded tube, means guiding movement of said aligning means and said tube to the molding position, means actuating said partible molds intermediate said spaced aligning means to enclose said aligned tube with the open end thereof in the neck portion of said mold, a combination shaping and blowing nozzle insertable in the lower open end of said tube and arranged to position said tube in axial alignment with the cavity of said mold, and means to supply fluid under pressure through said nozzle to expand said tube in said mold.

References Cited in the file of this patent

UNITED STATES PATENTS

| | | |
|---|---|---|
| 2,262,612 | Kopitke | Nov. 11, 1941 |
| 2,288,454 | Hobson | June 30, 1942 |
| 2,562,523 | Brunet | July 31, 1951 |
| 2,597,558 | Bailey | May 20, 1952 |
| 2,657,431 | Slaughter | Nov. 3, 1953 |
| 2,715,751 | Weber | Aug. 23, 1955 |
| 2,783,503 | Sherman | Mar. 5, 1957 |
| 2,810,934 | Bailey | Oct. 29, 1957 |